H. L. WITT.
RAT TRAP.
APPLICATION FILED JAN. 28, 1913.
1,095,613.
Patented May 5, 1914.
3 SHEETS—SHEET 1.
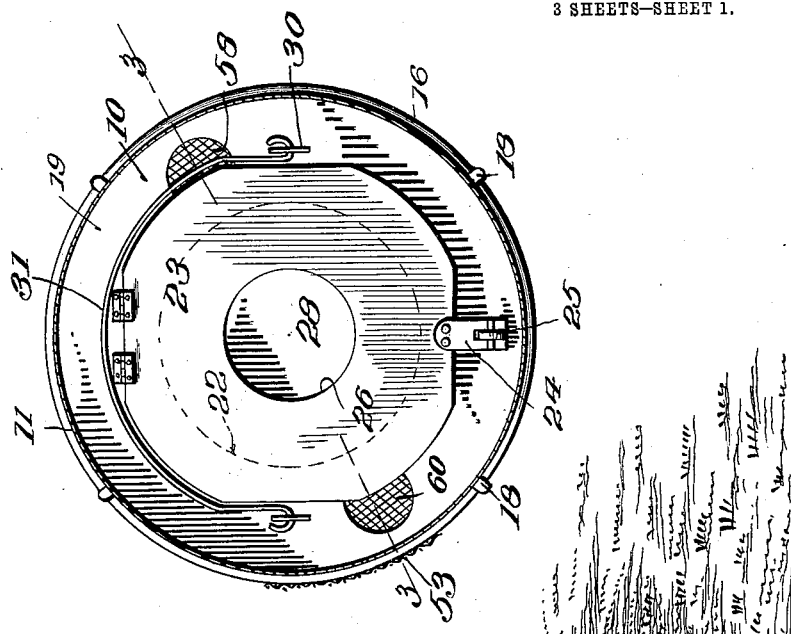
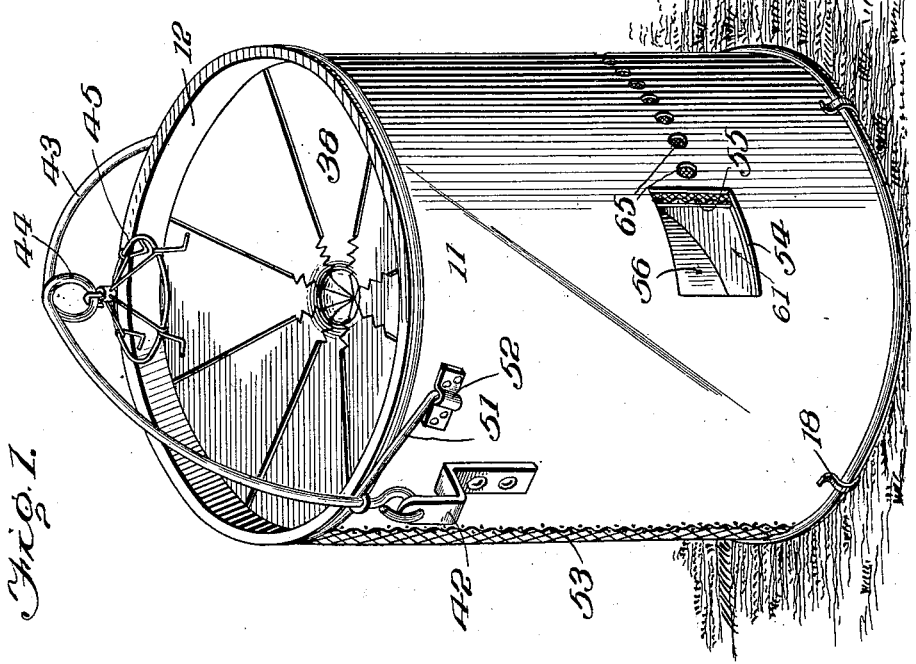
Witnesses
Inventor
H. L. Witt.
By
Attorneys.

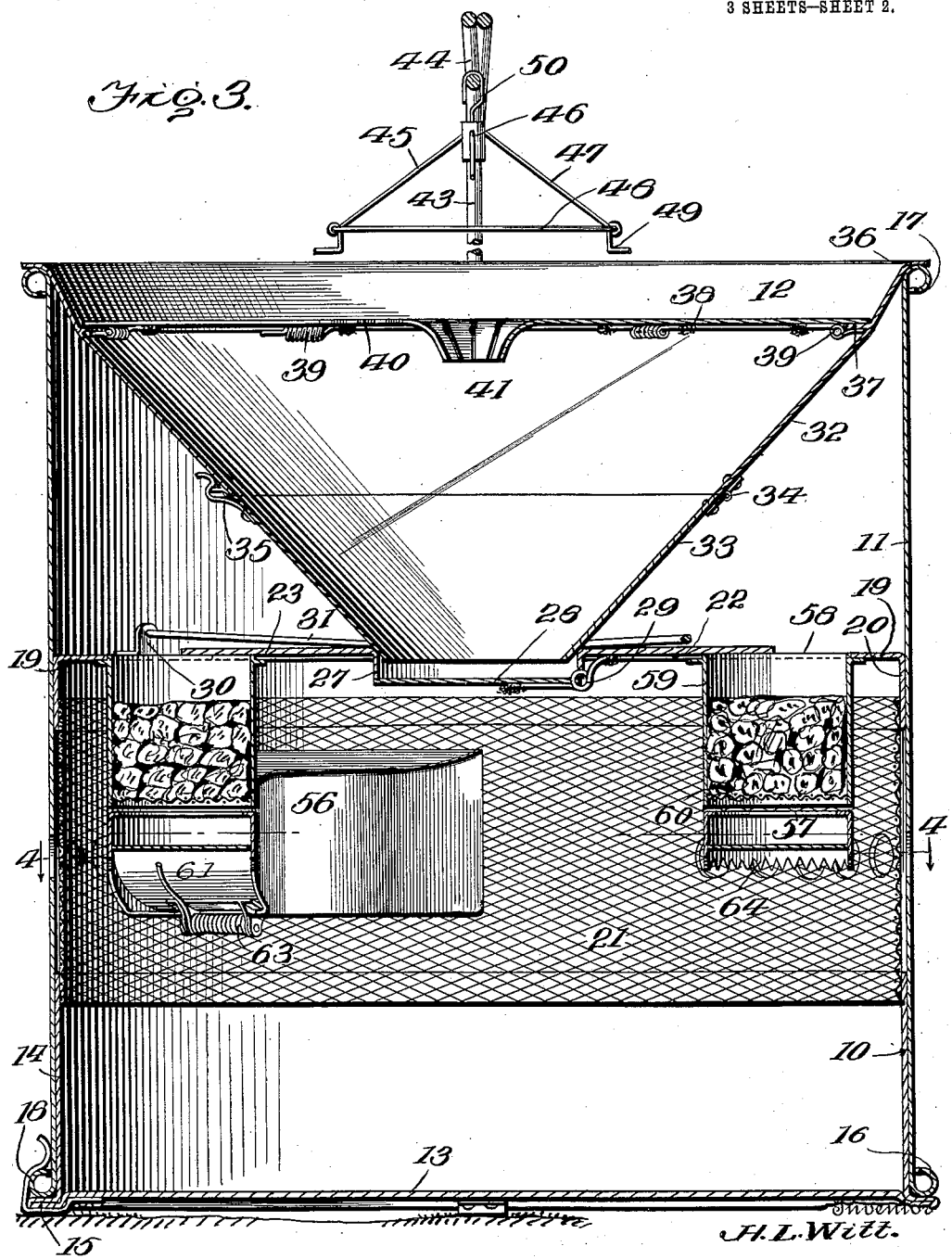

H. L. WITT.
RAT TRAP.
APPLICATION FILED JAN. 28, 1913.
1,095,613.
Patented May 5, 1914.
3 SHEETS—SHEET 3.
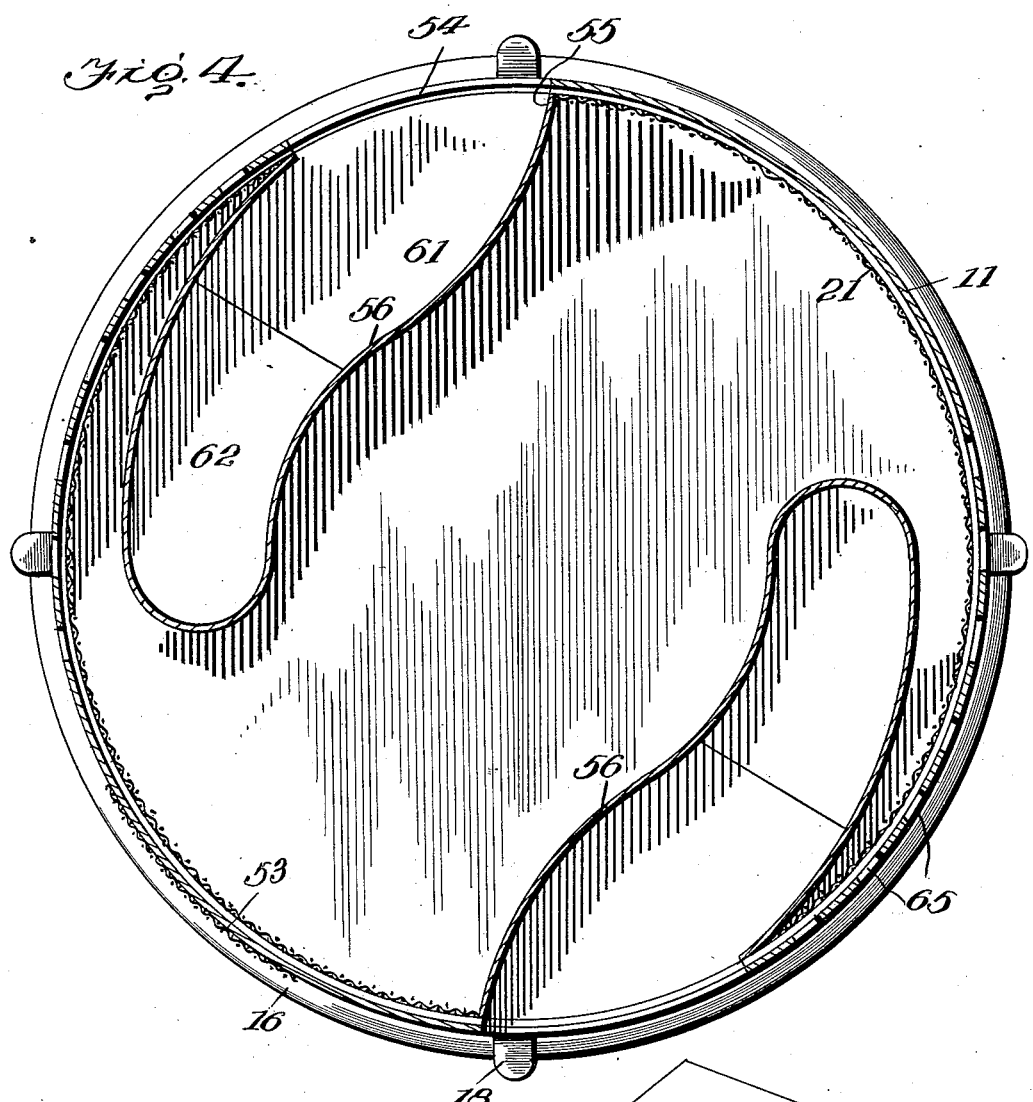
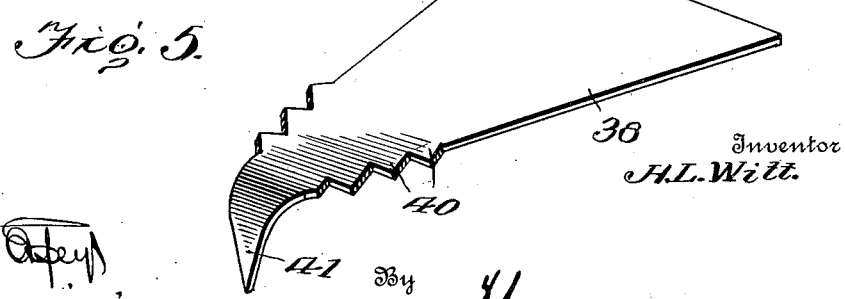

UNITED STATES PATENT OFFICE.

HARRY L. WITT, OF PITTSBURGH, PENNSYLVANIA.

RAT-TRAP.

1,095,613.   Specification of Letters Patent.   Patented May 5, 1914.

Application filed January 28, 1913.   Serial No. 744,738.

*To all whom it may concern:*

Be it known that I, HARRY L. WITT, a citizen of the United States, residing at Pittsburgh, in the county of Allegheny and State of Pennsylvania, have invented certain new and useful Improvements in Rat-Traps, of which the following is a specification.

My invention relates to new and useful improvements in traps and more particularly to traps for catching rats and other vermin, and the object of my invention is to provide a trap which will prove particularly attractive to animals of that type.

It is a well known fact that rats, mice and similar animals, in addition to other depredations, are continually robbing garbage cans and for this reason, although the rats may be too sly to be caught in any ordinary form of trap, they may be readily caught in a trap so constructed as to appear like a garbage can.

A further object of my invention is to provide a trap so constructed and arranged that the rats may enter from the top or sides and so arranged that all animals entering the trap will be ultimately caged in a single chamber.

A further object of my invention is to construct the trap in two main portions, one of which may be termed the outer portion and the other of which may be termed the inner portion, the rat caging chamber being formed in the inner portion and said portion being removable from the rest of the trap.

A further object of my invention is to provide the outer portion with a removable closure or cover including a plurality of swingingly mounted sector shaped portions normally held in horizontal position but movable, under the weight of a rat, to permit the rodent to drop into the body of the trap, the inner ends of said sector shaped portions being downturned and provided with interlocking teeth to prevent the escape of the rat either from the body of the trap through the top or if momentarily caught between the swinging sectors.

A further object of my invention is to so construct and arrange the inner portion of the trap that rats falling through the top of the outer portion will be immediately passed through the top of the inner portion into the rat caging chamber, escape being prevented therefrom by a spring pressed swinging closure provided in the inner member.

Still further objects of my invention are the provision of a netting or other suitable device to assist the rats to pass to the top of the trap, the provision of a peculiar form of bait holder which may be mounted upon a bail ordinarily employed in moving the trap from place to place, the provision of means for locking the bail in vertical position when the trap is in use to properly support the bait holder, and the provision of suitable bait holding chambers or wells in the inner trap member. And a still further object of my invention is to so construct the trap that the closure of the outer trap member may be employed by itself in connection with a garbage can, if desired, while at the same time the inner trap member may be employed as a separate trap either in connection with the outer trap member employed without its closure or by itself, as preferred. With these and other objects in view, my invention will be more fully described, illustrated in the accompanying drawings, and then specifically pointed out in the claims which are attached to and form a part of this application.

In the drawings: Figure 1 is a perspective view of the complete trap, the bail being shown in vertical position with the bait holder in place; Fig. 2 is a horizontal sectional view taken through the outer trap member and showing the inner trap member in plan; Fig. 3 is a vertical section on the line 3—3 of Fig. 2 and upon an enlarged scale to more clearly show the details of construction; Fig. 4 is a horizontal section on the line 4—4 of Fig. 3; Fig. 5 is a perspective view of one of the swinging sector plates detached from the cover proper, clearly showing its downturned inner end and the teeth formed upon its radial edges.

Corresponding and like parts are referred to in the following description and indicated in all the views of the drawings by the same reference characters.

The preferred embodiment of my invention consists primarily of three separable parts, namely, an inner trap member 10, which in use also forms the bottom of the trap proper, a cylindrical casing 11, which forms the outer body of the trap proper, and a closure 12 for the upper end of this casing.

Referring more specifically to Fig. 3 of the drawings, it will be seen that the inner trap member 10 includes a bottom 13, preferably formed of sheet metal and provided at its peripheral edge with an upwardly directed annular flange 14 forming a cylindrical lower wall for the inner trap member, this flange 14 and bottom 13 being so joined as to provide a laterally directed peripheral flange 15 exterior of the body member and forming a seat for the lower edge of the outer casing 11 which, as previously explained, is cylindrical in shape. The upper and lower edges of the casing 11 are bent outwardly to form reinforcing beads 16 and 17 and it is the bead 16 which seats upon the flange or lip 15. A plurality of spring catches 18 are secured at spaced intervals to the lower face of the bottom 13 and extend outwardly and upwardly about the flange 15 to engage by their free ends the bead 16 when the casing 11 is in place to lock the inner trap member and casing together.

The inner trap member further includes a top 19 having a downwardly directed peripheral flange 20 corresponding to the flange 14 of the bottom and the top and bottom are secured in proper spaced relation by means of a ring of foraminous material, preferably heavy wire screening 21 secured by its upper and lower edge portions to the free edges of the flanges 20 and 14, respectively. From the foregoing description it will be apparent that the bottom 13, top 19 and screen 21, when so joined, form a cylindrical inner trap member closed at its upper and lower ends and this inner trap member is so proportioned as to space its top substantially midway of the outer casing 11.

The top 19 of the inner trap member is provided centrally with a relatively large opening 22 which, as best shown in Fig. 2 of the drawings, is normally closed by a hinged door 23 having a hasp 24 adapted for engagement with a catch 25 carried by the top 19 to normally lock the door in closed position. This door 23 in turn is provided with a central opening 26 surrounded by an inturned flange 27 and this opening is closed by a swingingly mounted closure 28, the spring hinge 29 of which normally holds the closure in close engagement against the free edge of the flange 27. The top 19 of the inner trap member is provided at diametrically opposite points with ears 30 to swingingly receive a bail 31 by means of which the inner trap member may be moved from place to place when removed from the trap proper.

The cover 12 of the trap proper comprises a funnel shaped body formed in two parts 32 and 33, each part being funnel shaped and the two parts being so proportioned that in operative position, the one forms a continuation of the other. The parts 32 and 33 are swingingly connected by a hinge 34 at one side and are normally held in alinement with each other by a two-part spring catch 35 at the opposite side. Relative to the purpose for which the parts 32 and 33 are hingedly connected, it may be well to explain that this construction has been found in practice to facilitate the assembling of the sector plates which, as will be hereinafter more fully described, are arranged to normally close the upper enlarged end of the funnel-shaped body member. The hinging of the parts 32 and 33 also operates to make the cleaning of the funnel-shaped body member a more convenient procedure since a larger opening is afforded at the bottom of the body member for the insertion of the hand in the act of applying a rag or the like to the inner face of the funnel. The funnel shaped member 32 at its larger or free end is provided with a laterally directed encircling flange 36 which seats upon the bead 17 of the outer casing 11 when the cover 12 is in place, and when the cover is so positioned, the smaller or free end portion of the funnel shaped member 33 projects slightly through the opening 26 formed in the cover of the inner trap member, as clearly shown in Fig. 3 of the drawings.

The cover member 12 is provided adjacent its upper end with an inwardly directed horizontal flange 37 which completely encircles said member and a plurality of sector shaped plates 38 are mounted upon this flange by spring pressed hinges 39 which normally maintain the sector plates in horizontal position as shown in Figs. 1 and 3 of the drawings, the outer end portions of the plates, when in this position, seating upon the upper face of the flange 37 to prevent further outward swinging of the plates. The radial edges of the plates 38 engage closely against each other when the plates are in horizontal position and said radial edges adjacent the inner ends of the plates are each formed with a plurality of teeth 40 so arranged that the teeth of each plate interlock with the teeth of adjacent plates when in normal position. The inner pointed ends 41 of the plates 38 are bent inwardly as shown in Figs. 3 and 5 and form in effect a conical entrance to the funnel shaped portion of the cover 12, this entrance however, being too small to serve as a passage for the rats.

From the foregoing description it will be apparent that if a rat or other animal steps upon one or more of the sector plates 38 of the cover in an effort to reach the food or bait either placed upon the plates or supported above the same, its weight will cause the plate or plates to swing inwardly and the animal will slip between the inner ends of the plates and into the funnel shaped body member of the cover, passing through the same and through the opening 26 of the cover of the inner trap member, the closure 28 thereof being swung aside by the weight of the animal.

The bait may be placed directly upon the plates 38, if desired, but if this is done, each time an animal is caught in the trap, the trap will have to be re-baited as the bait will pass into the trap with the animal. To overcome this difficulty, I have provided the outer casing 11 at diametrically opposite points with ears 42 between which is swingingly mounted a bail 43 by means of which the trap as a whole may be moved from place to place. This bail is bent intermediate its length to provide an eye 44 from which may be supported a bait holder 45. This bait holder comprises a body 46 having downwardly and radially directed arms 47, the intermediate portions of which are bent about a ring 48 and the end portions of which are bent to form bait engaging hooks 49.

The body is supported in place by a hook 50 adapted to engage in the eye 44 of the bail. In order to prevent the bail from swinging out of place, I provide a hook 51 which is slidably mounted by one end upon the bail and the opposite end of which is adapted for engagement in an eye 52 carried by the casing 11, this hook and eye being so arranged as to hold the bail in vertical position and thus support the bait holder centrally above the trap.

In order to assist the rats in their efforts to reach the bait, the casing 11 may be provided at one side with a vertically extending strip of wire gauze or other suitable material 53 which if employed, will extend from the upper to the lower end of the casing and afford a foot hold for the animals assisting them to climb up the side of the trap.

Having thus described the general construction of the trap proper, I will now describe certain details of construction which permit rats to be caught by passing through openings 54 formed in the sides of the casing 11 and preferably at diametrically opposite points, this construction also being such as to permit the use of the inner trap member as a complete trap by itself, if desired. The netting 21 forming a portion of the wall of the inner trap member is cut away at diametrically opposite points as at 55 to register with the openings 54 of the casing 11 when the trap members are properly assembled.

Runways 56 open at their outer ends and closed at their inner ends are secured to the netting 21 with their open ends in registration with the openings therethrough. These runways extend in opposite directions in the trap and their side walls are curved to space the runways away from the center of the trap so as not to obstruct the passage of rats through the opening 26. The top walls of the runways are preferably inclined downwardly toward their inner ends and are provided at said ends with openings 57. The top 19 of the inner trap member is provided with openings 58 in alinement with these openings 57 and cylindrical casings 59 are secured to the lower face of the top surrounding the openings 58 and by their lower ends secured to the top walls of the runways surrounding the openings 57. These casings 59 are open at their upper ends and closed adjacent their lower ends by a screen of foraminous material 60. It will therefore be seen that the runways are each supported at their outer ends by the screen 21 and at their inner ends by the casings 59.

The floors 61 of the runways extend from their outer ends about half way to the inner ends and the bottoms of the runways are closed throughout the remainder of their length by hingedly mounted false floor sections 62, the rear ends of which are hingedly secured to the forward ends of the floor sections 61 by spring pressed hinges 63 which normally hold the false floor sections in a slightly upwardly inclined position between the side walls and inner end walls of the runways. As shown, the end walls and adjacent portions of the side walls of the runways have their lower edge portions, which extend below these false floors, cut away to provide a plurality of teeth 64.

From the above description, it will be apparent that if any suitable food or bait is placed in the casings 59 resting upon the screen 60 thereof, rats attracted by this food may enter the trap through the registering openings 54 and 55 and pass along the runways 56 until they reach the false floor sections 62 when their weight will cause these sections to swing downwardly throwing the rats into the inner trap member, the teeth formed in the walls of the runways preventing the escape of the rats even though the false floors are slow in closing. If desired, the outer casing 11 may be provided with a plurality of spaced openings 65 extending in line with the runways and through which the rats may scent the food or bait contained in the trap.

In operation, assuming the trap to be unassembled, any suitable bait or food is placed in the receptacles formed by the casings 59, the outer casing 11 is lowered over the inner casing 10 and the two casings locked together by the catches 18, the top 12 is applied, the handle or bail 43 locked in proper position and the bait holder 45, which has been previously baited, is hung in place. The trap may then be placed in position and all rats or other animals jumping or climbing to the top of the trap or entering through the openings 54 thereof will be caught in the manner previously described, all of said animals being ultimately caged in the inner trap member 10.

The rats so caught may be killed in any suitable manner, such as by submerging the entire trap in water or they may be killed by an electric current by connecting suitable conductors to the trap, if the latter be formed of metal.

In addition to employing the trap in the above described manner, it may be employed in a number of different ways. One method is to mount the outer casing 11 over a bucket or similar receptacle so that the top 12 will form a closure for the bucket. Relative to this application of the outer casing 11, it will be apparent that the outer walls of the bucket will seal the entrance of the outer casing. Furthermore, the top 12 may be removed from the trap and placed upon a garbage can or other waste receptacle and the can itself utilized as a trap, and when this is done, it will of course be apparent that the inner trap member may be separated from the outer casing and used as a separate trap or may be used as a trap while still connected with the outer casing.

Although I have illustrated and described the trap in all its details, it will of course be understood that various minor changes in construction may be made without in the slightest degree departing from the spirit of my invention. Moreover, although the trap is preferably constructed entirely of sheet metal and wire netting, it will of course be understood that it may be constructed of any suitable material and in any desired size, and that while the trap as shown is cylindrical in shape, it may be made in other shapes, if preferred, my invention residing in the relative arrangement and co-action of the parts rather than in the details of construction, materials employed and size and shape of the trap.

Having thus described the invention, what is claimed as new is:

1. A trap including a casing and a cover for the casing, said cover including a funnel shaped body member seating in the open end of the casing and open at its ends, said funnel shaped body member being provided with an inwardly directed horizontal flange arranged below the plane of the upper edge of the funnel shaped body member, a plurality of sector shaped plates hingedly mounted upon the flange, and springs normally holding the plates in horizontal position.

2. A trap including an inner trap member having an inturned flange at its upper end, a cover hinged to the flange and seating thereon and provided with an opening surrounded by a downturned flange, a spring pressed closure hinged to the lower face of the cover and bearing against the free edge of the downturned flange, an outer trap member inclosing the inner trap member, and means carried by the outer trap member for trapping rats and passing them through the opening in the cover of the inner trap member.

3. A trap including an inner trap member having an inturned flange at its upper end, a cover hinged to the flange and seating thereon and provided with an opening surrounded by a downturned flange, a spring pressed closure hinged to the lower face of the cover and bearing against the free edge of the downturned flange, an outer trap member inclosing the inner trap member, and means carried by the outer trap member for trapping rats and passing them through the opening in the cover of the inner trap member, said means including a funnel shaped cover for the outer trap member with its smaller end in registration with the opening in the cover of the inner trap member.

4. A trap including a casing open at its ends, an inner trap member positioned in the casing with its bottom forming a bottom for the casing and with its top forming an intermediate partition wall for the casing, said top being provided with an opening having a swingingly mounted closure normally held in operative position but depressible under weight, a funnel shaped cover for the upper end of the casing, the lower end of which registers with the closure of the inner trap member, said cover having a closure similar to the closure of the inner trap member, the casing and inner trap member being provided with registering openings, and runways secured by their outer ends to the inner trap member about the openings and extending inwardly of said trap member, said runways being provided at their inner ends with swingingly mounted false floor sections.

In testimony whereof I affix my signature in presence of two witnesses.

HARRY L. WITT. [L. S.]

Witnesses:
BENJAMIN GOLOMB,
PHILIP SANKIRKY.